(12) United States Patent
Tanaka et al.

(10) Patent No.: US 7,569,302 B2
(45) Date of Patent: Aug. 4, 2009

(54) FUEL CELL FOR GENERATING ELECTRIC POWER

(75) Inventors: Aoi Tanaka, Osaka (JP); Norihisa Mino, Osaka (JP); Nobuhiko Hojo, Neyagawa (JP); Taisuke Yamamoto, Nara (JP); Yumi Kondo, Osaka (JP)

(73) Assignee: Panasonic Corporation, Osaka (JP)

( * ) Notice: Subject to any disclaimer, the term of this patent is extended or adjusted under 35 U.S.C. 154(b) by 487 days.

(21) Appl. No.: 10/700,098

(22) Filed: Nov. 3, 2003

(65) Prior Publication Data
US 2004/0096729 A1 May 20, 2004

(30) Foreign Application Priority Data
Nov. 5, 2002 (JP) .............................. 2002-321663

(51) Int. Cl.
H01M 4/86 (2006.01)
H01M 4/90 (2006.01)
H01M 4/92 (2006.01)
H01M 4/96 (2006.01)

(52) U.S. Cl. .............................. 429/40; 429/42; 429/44
(58) Field of Classification Search .................... 429/12
See application file for complete search history.

(56) References Cited

U.S. PATENT DOCUMENTS

| | | | | |
|---|---|---|---|---|
| 3,351,494 | A * | 11/1967 | Batzold | 252/182.1 |
| 5,523,181 | A * | 6/1996 | Stonehart et al. | 429/314 |
| 6,746,793 | B1 * | 6/2004 | Gyoten et al. | 429/40 |
| 7,179,560 | B2 * | 2/2007 | Cho et al. | 429/33 |
| 2002/0037449 | A1 | 3/2002 | Binder et al. | |
| 2003/0031917 | A1 | 2/2003 | Katori et al. | |
| 2004/0241519 | A1 * | 12/2004 | Howard | 429/33 |

(Continued)

FOREIGN PATENT DOCUMENTS

EP 0 305 565 3/1989

(Continued)

OTHER PUBLICATIONS

March, Jerry, "Advanced Organic Chemistry: Reactions, Mechanisms, and Structure", 1968, McGraw Hill, p. 727.*

(Continued)

Primary Examiner—Robert Hodge
(74) Attorney, Agent, or Firm—Hamre, Schumann, Mueller & Larson, P.C.

(57) ABSTRACT

A cell according to the present invention is a fuel cell for generating an electric power by supplying one electrode with a fuel and the other electrode with an oxidant. In the fuel cell, a catalyst layer is formed on at least one surface of at least one of the one electrode and the other electrode. The catalyst layer is a layer including catalyst particles alone, a layer including a mixture of the catalyst particles and other particles, or a layer of a porous film carrying at least the catalyst particles, and a molecule including an ion-conducting functional group serving as an electrolyte is chemically bonded to a surface of at least one selected from the group consisting of the catalyst particles, the other particles and the porous film. At least one of the electrodes has a thin film electrolyte, a catalyst and an electron conducting substance, thereby suppressing the elution of the electrolyte from the catalyst layer in an electrode part and the accompanying voltage drop.

13 Claims, 7 Drawing Sheets

U.S. PATENT DOCUMENTS

2006/0099485 A1    5/2006    Yamaguchi et al.

FOREIGN PATENT DOCUMENTS

| | | | |
|---|---|---|---|
| EP | 0 637 851 | | 2/1995 |
| EP | 0 874 413 | | 10/1998 |
| JP | 61-295387 | | 12/1986 |
| JP | 61-295388 | | 12/1986 |
| JP | 62-61118 | | 12/1987 |
| JP | 62-61119 | | 12/1987 |
| JP | 2-48632 | | 10/1990 |
| JP | 3-184266 | | 8/1991 |
| JP | 3-295172 | | 12/1991 |
| JP | 5-36418 | | 2/1993 |
| JP | 06-111827 | * | 4/1994 |
| JP | 8-78021 | | 3/1996 |
| JP | 2000-228204 | | 8/2000 |
| JP | 2000-243404 | | 9/2000 |
| JP | 2000-353528 | | 12/2000 |
| JP | 2002-203576 | | 7/2002 |
| JP | 2002-246033 | | 8/2002 |
| WO | 01/28024 | | 4/2001 |
| WO | 02/084767 A2 | | 10/2002 |

OTHER PUBLICATIONS

D. Wang et al., "A TOF SIMS Study of the Incorporation of Aluminium into the Silane Coating on E-Glass Fibres", Catalysis Today, vol. 12, Feb. 24, 1992, pp. 375-383.

D. Wang et al., "TOF SIMS and XPS study of the interaction of silanized E-glass with epoxy resin", Journal of Material Science, vol. 28, 1993, pp. 1396-1408.

D. Wang et al., "TOF SIMS and XPS Study of the Interaction of Aminosilanised E-Glass Fibres with Epoxy Resins. Part I: Diglycidyl Ether of Bisphenol S", Composites Science and Technology, vol. 50, Issue 2, pp. 215-228.

Atsushi Murase, "Analysis of Organic Matters at Material's Topsurface by TOF-SIMS", Toyota Central R&D Labs., Inc., R&D Review vol. 34, No. 2, Jun. 1999, pp. 11-18.

* cited by examiner

FIG. 11

FUEL CELL FOR GENERATING ELECTRIC POWER

BACKGROUND OF THE INVENTION

1. Field of the Invention

The present invention relates to a fuel cell that uses directly hydrogen, methanol, ethanol, dimethyl ether, isopropyl alcohol, ethylene glycol, glycerin, methane, dimethoxymethane and the like as a fuel and the air, oxygen or ozone as an oxidant.

2. Description of Related Art

A fuel cell generates electric power by an electrochemical reaction between a fuel capable of generating a hydrogen ion such as hydrogen and an oxygen containing oxidant such as the air. Its structure will be described herein. First, catalyst layers are formed respectively on both surfaces of a polymer electrolyte for transporting hydrogen ions selectively. Next, on outer surfaces of these catalyst layers, gas diffusion layers are formed using, for example, a water-repellent electrically conductive carbon particle paper that has both fuel gas permeability and electron conductivity. The catalyst layer and the gas diffusion layer form an electrode.

Then, a gas sealant or a gasket is disposed so as to surround the electrode and sandwich the polymer electrolyte so that a fuel to be supplied may not leak out and be mixed with the oxidant. This sealant or gasket is integrated with the electrode and the polymer electrolyte, thus forming a membrane electrode assembly (MEA).

In general, the catalyst layer of the fuel cell is produced by preparing a paste of a platinum-based precious metal catalyst as a catalyst with electrically conductive carbon particles such as carbon black or graphite (a catalyst carrier) and a polymer electrolyte, and forming a thin film of this paste.

Currently, "Nafion" (trade name; manufactured by DuPont.), which is a perfluorocarbon sulfonic acid polymer, is in general use as the polymer electrolyte. In order to provide the "Nafion" with hydrogen ion conductivity, it is necessary to humidify it.

The incoming fuel from an anode side is separated into hydrogen ions and electrons on the catalyst of the electrode, while hydrogen ions and electrons that have passed through the electrolyte react with the oxidant on the catalyst on a cathode side. At this time, electric energy can be obtained.

In the case where hydrogen is used as the fuel, the reactions below occur in the respective electrodes.

Anode: 
Cathode:

Alternatively, in the case where methanol is used as the fuel, the reactions below occur.

Anode: 
Cathode:

On the catalyst layer inside the electrode, reactants and products are diffused, and the electrons and the hydrogen ions move. Thus, the size of a three-phase zone, which is a reaction point and serves as a passage of each of the fuel, the electrons and the hydrogen ions, becomes important.

The area of the three-phase zone is an effective area of the catalyst. As this area becomes larger, a utilization factor of the catalyst increases, leading to a higher cell performance. By including the polymer electrolyte in the catalyst layer as described above, the reaction area increases.

Conventionally, attempts have been made to provide a layer in which the electrode and the polymer electrolyte are mixed and dispersed at an interface between the electrode and the electrolyte. A conventional technology has suggested a method of applying a dispersed solution of the polymer electrolyte and a mixture of catalyst onto a polymer electrolyte membrane and hot-pressing with an electrode, followed by reduction of the catalyst compound, and a method including the reduction, the application and then the hot-pressing (for example, see JP 62(1987)-61118 B and JP 62(1987)-61119 B).

Further, there has been a method of forming a porous electrode, spraying the polymer electrolyte solution on the electrode, and then hot-pressing this electrode and the polymer electrolyte membrane (for example, see JP 2(1990)-48632 B and JP 3(1991)-184266 A). There also is a method of mixing powder prepared by coating a surface of polymeric resin with a polymer electrolyte into an electrode (for example, see JP 3(1991)-295172 A). Moreover, there is a method of mixing a polymer electrolyte, a catalyst, carbon powder and a fluorocarbon resin and forming a film to be an electrode (for example, see JP 5(1993)-36418 A).

However, the above-mentioned conventional catalyst layer uses the polymer electrolyte that is soluble in water and an alcohol solution such as ethanol.

When an alcohol such as methanol is used as the fuel, a reaction occurs such that alcohol:water=1:1. Accordingly, during power generation, the electrolyte elutes into the alcohol solution, so that the three-phase zone decreases, lowering the reaction efficiency, and causing a problem of voltage drop.

Furthermore, the electrolyte elutes into water generated in the cathode during power generation and humidifying water necessary for hydrogen ion conduction, so that the three-phase zone decreases, lowering the voltage.

SUMMARY OF THE INVENTION

In order to solve the conventional problems described above, the present invention provides a fuel cell using a thin film electrolyte that does not elute into water or alcohol, thereby achieving an increased area of a three-phase zone in a catalyst layer so as to obtain a long lifetime and high voltage.

A fuel cell of the present invention is a fuel cell for generating an electric power by supplying one electrode with a fuel and the other electrode with an oxidant. The fuel cell includes a catalyst layer formed on at least one surface of at least one of the one electrode and the other electrode. The catalyst layer is a layer including catalyst particles alone, a layer including a mixture of the catalyst particles and other particles, or a layer of a porous film carrying at least the catalyst particles, and a molecule including an ion-conducting functional group serving as an electrolyte is chemically bonded to a surface of at least one selected from the group consisting of the catalyst particles, the other particles and the porous film.

DESCRIPTION OF THE PREFERRED EMBODIMENTS

The present invention relates to a fuel cell. In the fuel cell of the present invention, its catalyst layer is a layer including catalyst particles alone, a layer including a mixture of the catalyst particles and other particles, or a layer of a porous film carrying at least the catalyst particles, and a molecule including an ion-conducting functional group serving as an electrolyte is chemically bonded to a surface of at least one selected from the group consisting of the catalyst particles, the other particles and the porous film. The ion-conducting functional group functions as an electrolyte. It is preferable that the chemical bond is any of a covalent bond, an ionic bond, a coordinate bond and a metallic bond. In particular, a covalent bond formed by an elimination reaction is preferable because it is the most stable in chemical and physical terms. Here, the elimination reaction refers to dehydrohalogenation, dealcoholization (wherein the alcohol has 1 to 3 carbon atoms) or the like.

It is preferable that the molecule including the ion-conducting functional group has a mean molecular weight of 40 to 10,000. The molecule including the ion-conducting functional group needs to be directly chemically-bonded to a substrate, and a molecular weight of at least 40 is necessary for the molecule to have a functional group needed for that chemical bond. On the other hand, the molecular weight exceeding 10,000 is not appropriate because such a large molecular weight makes it difficult to achieve a conformation that is most suitable for forming a molecular thin film, and thus, the molecule including the ion-conducting functional group cannot be bonded to the substrate suitably.

The molecular weight can be determined by "TOF-SIMS (Time-of-Flight Secondary Ion Mass Spectrometry)." TOF-SIMS is a generally-used surface analysis method, which is also detailed in the documents below.

(1) Wang, D., et al.: Catal. Today, 12(1992), 375
(2) Wang, D., et al.: J. Mater. Sci., 28(1993), 1396
(3) Wang, D., et al.: Compos. Sci. Technol., 50-2(1994), 215
(4) Toyota Central R&D Labs., Inc., R&D Review Vol. 34, No. 2 (1996.2), 11 (to which reference is to be made in particular)

In the above description, the molecular thin film refers to a film formed by allowing an elimination reaction such as dehydrochlorination, dealcoholization or deisocyanation between a reactive group such as a chloro group, an alkoxyl group or an isocyanate group present at the end of a molecule and an active hydrogen (a hydroxyl group, a carboxyl group, an amino group, an imino group or the like) of a substrate, and a film obtained by a polymerization of the above film. For example, in the case where the functional group at the end of the molecule is $-SiCl_3$, $-Si(OR)_3$ (wherein R is an alkyl group having 1 to 3 carbon atoms) or $-Si(NCO)_3$, when an active hydrogen included in $-OH$ group, $-CHO$ group, $-COOH$ group, $-NH_2$ group, $>NH$ group or the like is present on the surface of the substrate or that of an underlying layer formed on the substrate, dehydrochlorination, dealcoholization or deisocyanation occurs so as to covalently-bond a chemisorbed molecule to the surface of the substrate or that of the underlying layer formed on the substrate. The molecular film formed by this method is called a "chemisorption film" or a "self assembling film." In order to further polymerize this chemisorption film, unsaturated bonds are allowed to be present in the molecules in advance, and the molecules are polymerized by photopolymerization or the like after forming the chemisorption film.

It is preferable that the molecule including the ion-conducting functional group includes at least one organic group selected from the group consisting of fluorocarbon and hydrocarbon. This creates a state in which water molecules cannot pass through easily and protons can pass through easily. In particular, a fluorocarbon group ($(CF_2)_n-$, wherein n ranges from 2 to 30) is preferable because it is sufficiently stable at high electric potentials that the molecule is not cleaved easily, the protons can pass through easily and the water molecules cannot pass through easily.

It is preferable that the ion-conducting functional group is a proton dissociating functional group.

It is preferable that the proton dissociating functional group is at least one functional group selected from the group consisting of a phosphonyl group, a phosphinyl group, a sulfonyl group, a sulfinic group, a sulfonic group and a carboxyl group.

It is preferable that the ion-conducting functional group is a hydrogen bondable functional group. This allows proton conduction utilizing water molecules bonded to the hydrogen bondable functional group, so that an electrode catalyst reaction can be achieved.

It is preferable that the hydrogen bondable functional group is at least one functional group selected from the group consisting of a mercapto group, an ether linkage group, a nitro group, a hydroxyl group, a quaternary ammonium base and an amino group.

It is preferable that the chemical bond is at least one bond selected from the group consisting of a covalent bond, an ionic bond, a coordinate bond and a metallic bond. It is preferable that the chemical bond is a covalent bond formed by an elimination reaction. This is because the most stable bond can be achieved.

It is preferable that the chemical bond is a bond via an oxygen atom. Besides the oxygen atom, the chemical bond may be a bond via a nitrogen atom. This is because the above-mentioned elimination reaction occurs between, for example, a chloro group or an alkoxyl group at the end of a molecule of an organic compound and an active hydrogen, for example, a hydroxyl group ($-OH$), a carboxyl group ($-COOH$), an amino group ($-NH_2$), or an imino group ($>NH$), on the substrate surface.

It is preferable that the catalyst particles include at least one selected from the group consisting of platinum, gold, palladium, nickel, rhodium, cobalt, iridium, osmium and iron. This is because they are an excellent oxidation catalyst.

It is preferable that the catalyst layer further includes an electron conductor.

It is preferable that the electron conductor is carbon, since carbon has an excellent electron conductivity and is electrochemically stable and its surface has a functional group to which the molecule including the ion-conducting functional group can be chemically bonded.

It is preferable that the other particles are an inorganic substance. It is preferable that the inorganic substance includes at least one selected from the group consisting of silica, alumina, quartz, glass, ceramics and mica. This is because the surface of the inorganic substance has a functional group to which the molecule including the ion-conducting functional group can be chemically bonded, and in particular, the densities of the functional groups present on the surface of silica and alumina are higher than those of other inorganic substances. In the above description, the ceramics may include glass, since there also are glassy ceramics such as porcelain and pottery.

It is preferable that the inorganic substance is in the form of particles.

It is preferable that the inorganic substance particles have a mean particle diameter ranging from 0.1 to 100 μm. When the mean particle diameter exceeds 100 μm, the surface area of the inorganic substance particles is so small that the molecules having the ion-conducting functional group are sparse, lowering ion conductivity. On the other hand, when the mean particle diameter is smaller than 0.1 μm, the inorganic substance particles are covered with the catalyst and the electron-conducting substances, so that ions cannot be conducted to the electrolyte part. Consequently, the cell voltage drops.

It is preferable that the porous film has a porosity ranging from 5% to 95%. The porosity smaller than 5% lowers diffusibility of the fuel and products, so that power generation becomes difficult especially in a large current density region requiring a large amount of fuel (diffusion controlled). On the other hand, when the porosity is larger than 95%, the electron movement between the electron-conducting substances and the ion conduction between the ion-conducting substances become difficult, so that the power generation becomes difficult especially in a large current density region.

It is preferable that the porous film has a mean pore diameter ranging from 0.1 nm to 10 μm. When the mean particle diameter is smaller than 0.1 nm, the molecule having the ion-conducting functional group enters into the pores and it is difficult to form a chemical bond. On the other hand, when the mean particle diameter is larger than 10 μm, the ion-conducting functional groups are spaced away farther than an ion-conductible distance. As a result, the ion-conducting speed decreases, so that the speed of the catalyst reaction also lowers.

It is preferable that the catalyst layer has a thickness ranging from 0.1 to 10000 μm. The thickness smaller than 0.1 μm makes it difficult to withstand the pressure during cell production and that for fuel supply. On the other hand, the thickness larger than 10000 μm lowers the fuel diffusibility, so that the cell voltage drops.

The electrolyte of the present invention (hereinafter, referred to as a "thin film electrolyte") is obtained by, for example, chemically bonding the molecule including the ion-conducting functional group to any of the catalyst particles, the other particles and particles serving as a material of the porous film, and then compression-molding the particles so as to form them into a sheet, a plate or a film. Other methods may include compression-molding the particles in advance so as to form them into a sheet, a plate or a film, and then chemically bonding the molecule including the ion-conducting functional group thereto.

In accordance with the present invention, since at least one of the electrodes has the thin film electrolyte, the catalyst and the electron-conducting substance, it is possible to suppress the elution of the electrolyte from the catalyst layer of the electrode part and the voltage drop accompanying therewith.

EXAMPLES

The following is a specific description of the present invention by way of examples.

Example 1

Example 1 is directed to an exemplary case in which a catalyst layer includes catalyst particles alone.

Platinum black (HiSPEC1000, manufactured by Johnson Matthey plc., mean particle diameter: 1.5 μm, catalyst particles serve as a substrate to which a thin film electrolyte is bonded) burned at 600° C. in a nitrogen atmosphere and platinum ruthenium black (HiSPEC6000, manufactured by Johnson Matthey plc., mean particle diameter: 2.0 μm) treated in a similar manner were used as a cathode catalyst and an anode catalyst, respectively.

Molecules containing an ion-conducting functional group serving as an electrolyte (hereinafter, referred to as a thin film electrolyte) were chemically bonded to the surfaces of the cathode catalyst and the anode catalyst, thus forming catalyst layers. The method for producing the catalyst layers is as follows.

1 wt % of trichlorosilane compound: $CH_2=CH-(CF_2)_{14}(CH_2)_2SiCl_3$ containing a vinyl group at its end and a fluorocarbon chain at its middle part, which was a reactant, was dissolved in a nonaqueous solvent in which n-hexadecane and chloroform were mixed at 4:1. The platinum black and the platinum ruthenium black serving as the catalysts were immersed in this solution for 2 hours. Dehydrochlorination occurred between a hydroxyl group (—OH) present on the catalyst surface and a chloro group in the trichlorosilane compound, so that a monomolecule of the trichlorosilane compound was bonded to the catalyst surface via oxygen as shown in the formula (1) below.

After the resultant particles were washed in chloroform, which was a nonaqueous solvent, so as to remove unreacted substances, they were allowed to react with water in the air. Consequently, the monomolecules were bonded to each other via oxygen so as to form a molecular thin film derived from the trichlorosilane compound as shown in the formula (2) below.

(2)

Next, the catalyst whose surface was provided with the thin film was allowed to react with a fuming sulfuric acid, whereby an unsaturated bond (a vinyl bond) at the end of the molecule was sulfonated, so that a molecular thin film shown in the formula (3) below was formed. This molecular thin film had a molecular weight of about 912 and a molecular length of 2.8 nm. Here, a $SO_3-$ group was a group having an ion conductivity, which was formed uniformly on the surface of the molecular thin film in the present embodiment.

(3)

Figure 1:
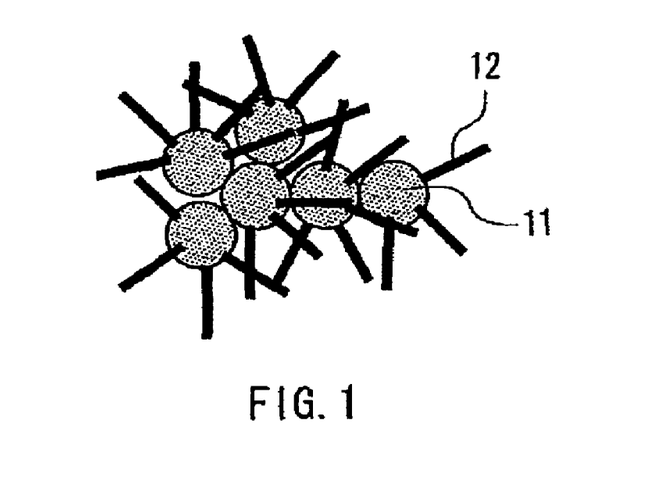
FIG. 1 is a schematic view showing a catalyst layer according to Example 1 of the present invention.

The catalyst provided with the thin film electrolyte was mixed with ion exchanged water and dispersion of polytetrafluoroethylene (PTFE) (ND-1, manufactured by DAIKIN INDUSTRIES, Ltd.), thus preparing a paste. When preparing the paste, the mixed ratio based on weight was ion exchanged water:catalyst with thin film electrolyte=1:10 and the PTFE dispersion was 1 wt %. FIG. 1 is a schematic view showing the catalyst layer in the present example. In FIG. 1, numeral 11 denotes the platinum black or the platinum ruthenium black serving as the catalyst, and numeral 12 denotes the thin film electrolyte.

The electrolyte part used in the present example was prepared using a thin film electrolyte, whose production method was as follows. A trialkoxysilane compound $H^+SO_3-(CH_2)_2(CF_2)_{14}(CH_2)_2Si(OCH_3)_3$ was pressed into pores of a 60 μm thick alumina membrane filter, which was an inorganic porous body, (outer dimension: 8 cm×8 cm) having 0.02 μm pores. Dealcoholization occurred between a hydroxyl group (—OH) on the alumina surface and an alkoxy group (in this case, a methoxy group: —$OCH_3$), so that a trialkoxysilane compound was bonded to the alumina as shown in the formula (4).

(4)

The monomolecules were bonded to each other by the dealcoholization, so that the thin film electrolyte was formed in the pores as shown in the formula (5) below.

(5)

Figure 2:
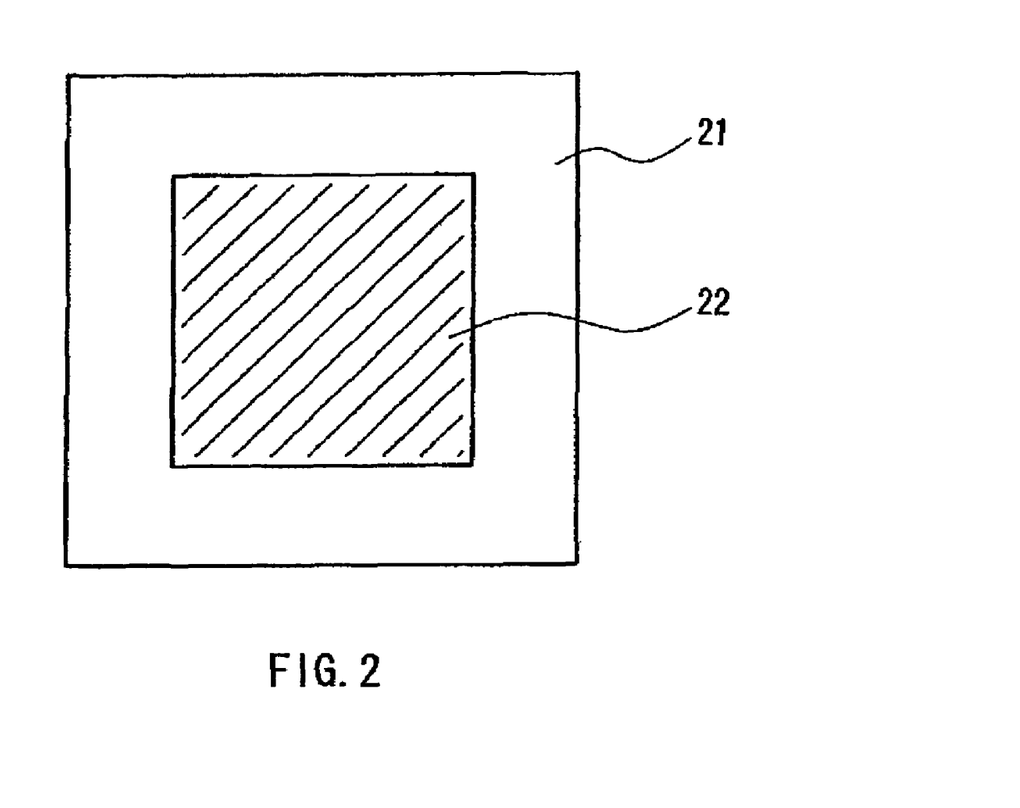
FIG. 2 is a schematic plan view showing an electrolyte membrane electrode assembly (MEA) of a fuel cell according to Example 1 of the present invention.

Onto both surfaces of the obtained electrolyte part, the catalyst pastes prepared respectively for the anode and the cathode were applied in a size of an outer dimension of 5 cm×5 cm at the center of the electrolyte part and dried in an electric furnace at 50° C., thus forming the catalyst layers. From both of the outer sides, the catalyst layers were sandwiched as one piece by water-repellent carbon papers (TGP-H-060, manufactured by Toray Industries. Inc., outer dimension: 5 cm×5 cm), thus forming electrodes. The portion including the anode electrode, the electrolyte part and the cathode electrode was called a membrane electrode assembly (MEA), and the one produced in the present method was referred to as a MEA 1. FIG. 2 is a schematic view showing the MEA. Numeral 21 denotes the electrodes, and numeral 22 denotes the electrolyte part.

An outer peripheral portion of the MEA 1 was sandwiched by 150 μm thick gaskets made of silicone rubber (outer dimension: 8 cm×8 cm), then hot-pressed at a gauge pressure of 2.5 Mpa·g. Further, manifolds for cooling water, fuel and oxidant flows were formed.

Figure 3:
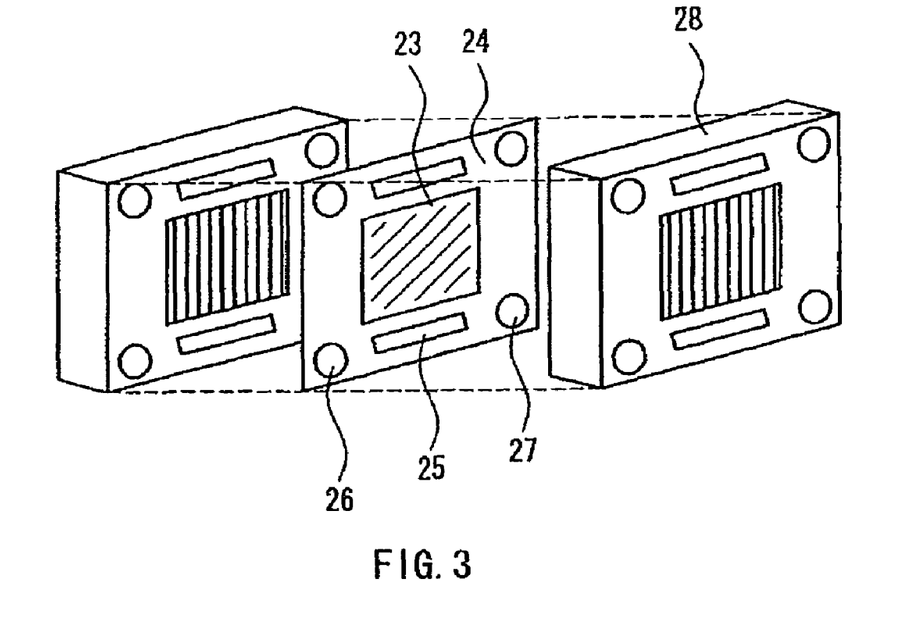
FIG. 3 is a perspective view showing a structure of a unit cell of the fuel cell according to Example 1 of the present invention.

Subsequently, a separator formed of a 13 mm thick resin-impregnated graphite plate having an outer dimension of 8 cm×8 cm and fuel, oxidant and cooling water channels of 5 mm were prepared. Two separators were used so that the separator provided with the oxidant channel was superposed on one surface of the MEA joined to the gasket plate and the separator provided with the fuel channel was superposed on the other surface thereof, thus forming a unit fuel cell 1. FIG. 3 is a schematic view showing the unit cell. Numeral 23 denotes the MEA, numeral 24 denotes the gasket plate, numerals 25, 26 and 27 denote the manifolds, and numeral 28 denotes the separator.

The fuel and cooling water to the separator 28 were sent to each cell through the manifolds 25, 26 and 27, flowed through the channels on the separator 28 and were supplied to the MEA 23.

Figure 4:
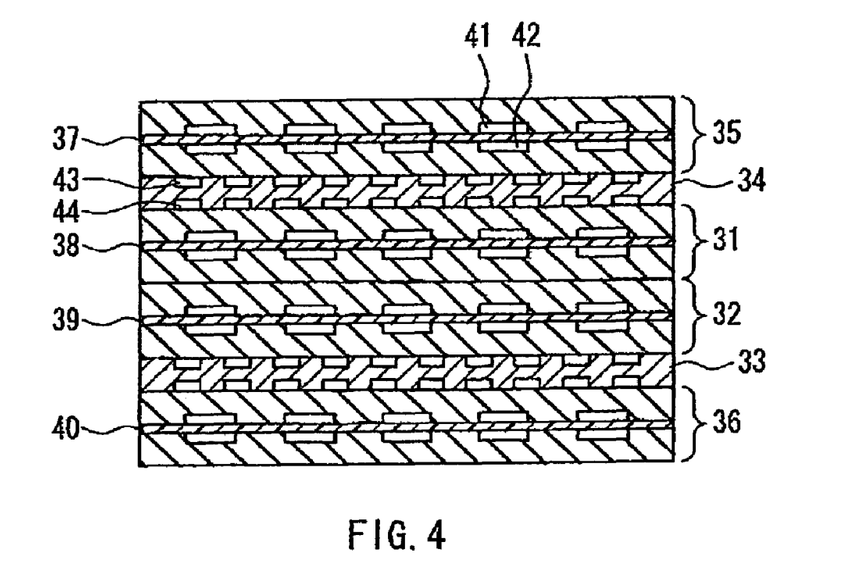
FIG. 4 is a sectional view showing a stacked structure in which the unit cells of the fuel cell according to Example 1 of the present invention are stacked.

FIG. 4 is a sectional view showing how the unit cells obtained in FIG. 3 were stacked and connected in series. After unit cells 31 and 32 were stacked, they were sandwiched by separators 33 and 34 provided with cooling water channels 43 and 44, and then unit cells 35 and 36 were stacked on outer sides of the separators 33 and 34. In this manner, an 8-cell-layered cell stack was formed. In other words, adjacent cells were connected in series via the separators 33 and 34. Numerals 37, 38, 39 and 40 each denote a MEA.

In this case, both ends of the cell stack were fixed using stainless steel current collector plates with gold-plated surfaces, insulator plates formed of an electrically insulating material and further end plates and fastening rods. The fastening pressure was $1.47 \times 10^6$ Pa (15 kgf/cm$^2$).

Example 2

Example 2 is directed to an exemplary case in which a catalyst layer includes catalyst particles and electron conducting particles. The catalyst particles serve as a substrate to which a thin film electrolyte is bonded.

Figure 5:
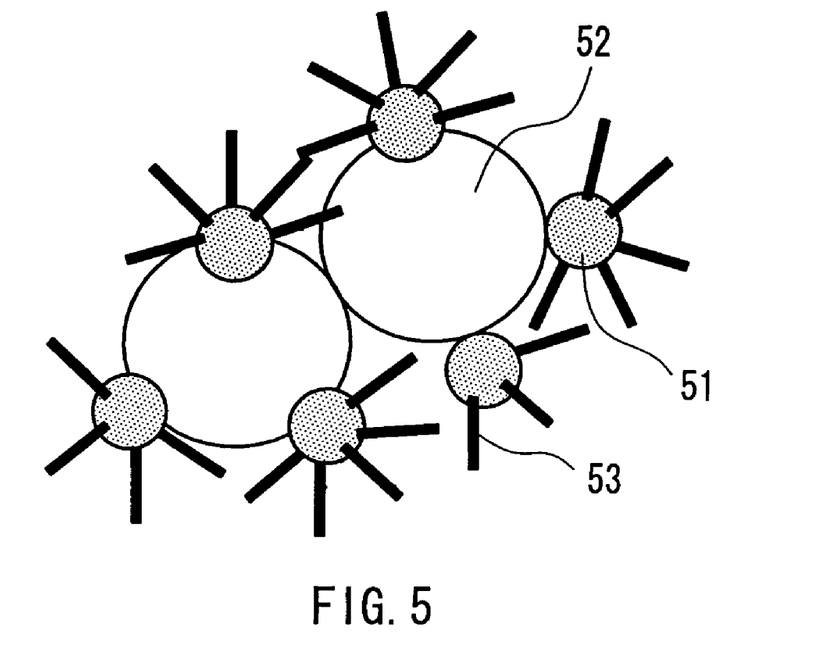
FIG. 5 is a schematic view showing a catalyst layer according to Example 2 of the present invention.

After platinum carrying carbon manufactured by Tanaka Kikinzoku Kogyo K.K. (TEC10E50E, mean particle diameter: 30 μm) or platinum ruthenium carrying carbon manufactured by Tanaka Kikinzoku Kogyo K.K. (TEC61E54, mean particle diameter: 30 μm) was burned at 600° C. in a nitrogen atmosphere, the trichlorosilane compound described in Example 1 was formed into a molecular thin film on a catalyst surface according to the method described in Example 1. By sulfonation thereafter, a thin film electrolyte was produced on the platinum or platinum ruthenium catalyst carried on the carbon. This made it possible to produce the thin film electrolyte formed of an organic silane compound on the platinum or the platinum ruthenium alloy on the carbon. FIG. 5 is a schematic view showing the catalyst layer. Numeral 51 denotes the platinum or the platinum ruthenium alloy serving as the catalyst, numeral 52 denotes the carbon carrying the catalyst, and numeral 53 denotes the thin film electrolyte.

The resultant carbon carried catalyst with the thin film electrolyte was mixed with ion exchanged water and a PTFE dispersion by a method similar to that in Example 1, thus obtaining a catalyst paste. At this time, the mixed ratio based on weight was ion exchanged water:carbon carried catalyst with thin film electrolyte=5:1 and 1 wt % of the PTFE dispersion was added. The paste was applied to an electrolyte part produced according to the method described in Example 1 and formed into one piece with carbon papers according to the method described in Example 1. In this manner, a MEA 2 was produced. A unit cell 2 was produced using the MEA 2 by the method described in Example 1.

Example 3

Example 3 is directed to an exemplary case in which a catalyst layer includes a mixed layer of catalyst particles and other particles. The other particles (in the present example, silica particles) added to the catalyst layer serve as a substrate to which a thin film electrolyte is bonded.

Figure 6:
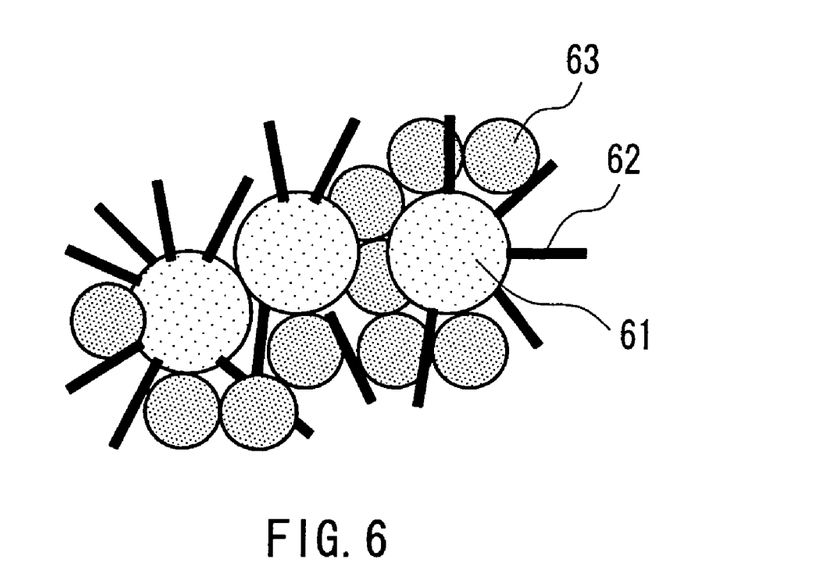
FIG. 6 is a schematic view showing a catalyst layer according to Example 3 of the present invention.

The trichlorosilane compound described in Example 1 was bonded to the surface of silica particles with a diameter of 100 nm (error of ±15 nm) according to the method described in Example 1, followed by sulfonation, thus producing a thin film electrolyte on the silica surface. In the above, platinum black (HiSPEC1000, manufactured by Johnson Matthey plc.) or platinum ruthenium black (HiSPEC6000, manufactured by Johnson Matthey plc.) was mixed as a catalyst so that the weight ratio of silica particles:catalyst=1:10. FIG. 6 is a schematic view showing the catalyst layer. Numeral 61 denotes the silica particles, numeral 62 denotes the thin film electrolyte, and numeral 63 denotes the platinum black or the platinum ruthenium black.

Further, 1 wt % of a mixed solution of ethanol and ion exchanged water (ethanol: ion exchanged water=4:1) and a PTFE dispersion (ND-1, manufactured by DAIKIN INDUSTRIES, Ltd.) was added thereto and stirred ultrasonically at a room temperature, thus preparing a catalyst layer paste.

A predetermined sized (5 cm×5 cm) masking was provided on an electrolyte part including the thin film electrolyte produced according to the method described in Example 1, and the catalyst paste was sprayed on both surfaces of the anode and the cathode and formed in one piece with carbon papers by the method described in Example 1, thus forming a MEA 3. Then, a unit cell 3 was produced using the MEA 3 according to the method described in Example 1.

Example 4

Example 4 is directed to an exemplary case in which a catalyst layer includes a catalyst and an electron conducting substance and the electron conducting substance (in this case, carbon black) of the catalyst layer serves as a substrate to which a thin film electrolyte is bonded.

Platinum carrying carbon manufactured by Tanaka Kikinzoku Kogyo K.K. (TEC10E50E) or platinum ruthenium carrying carbon manufactured by Tanaka Kikinzoku Kogyo K.K. (TEC61E54) was heated with a fuming sulfuric acid in a nitrogen atmosphere at a temperature from 55° C. to 60° C. and stirred for 50 hours. This was dropped in absolute ether maintained at 0° C. so as to obtain a solid. This solid was stirred with distilled water in a nitrogen atmosphere for 10 hours, and solids obtained after filtering were dried in a vacuum. Among the resultant solids, the platinum carrying carbon was used for the cathode, and the platinum ruthenium carrying carbon was used for the anode.

Figure 7:
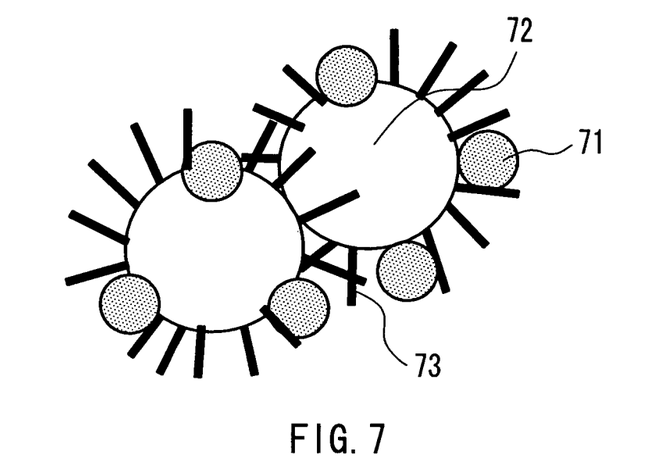
FIG. 7 is a schematic view showing a catalyst layer according to Example 4 of the present invention.

According to the method described in Example 1, a molecular thin film was formed on the surface of each catalyst carrying carbon that had been treated, followed by sulfonation, thus obtaining a thin film electrolyte. On the sulfuric acid-treated carbon surface, a hydroxyl group (—OH group) and a carboxyl group (—COOH group) were present. Dealcoholization occurred between this part and a methoxy group of the silane compound, so that a molecular thin film from the silane compound was formed on the carbon. FIG. 7 is a schematic view showing this catalyst. Numeral 71 denotes the platinum or the platinum ruthenium alloy serving as the catalyst, and numeral 72 denotes the carbon carrying the catalyst. Also, numeral 73 denotes the thin film electrolyte on the carrier carbon.

The resultant molecular thin film was mixed with a Flemion solution FSS-1 (manufactured by ASAHI GLASS CO., LTD., 9 wt % ethanol solution), which was a perfluorocarbon sulfonic acid solution, and deionized water so as to prepare a paste, which was then applied onto both surfaces of the electrolyte produced by the method described in Example 1, dried and formed in one piece with carbon papers according to the method described in Example 1, thus obtaining a MEA 4. Then, a unit cell 4 was produced using the MEA 4 according to the method described in Example 1.

Example 5

Example 5 is directed to an exemplary case in which a catalyst layer includes a catalyst and an electron conducting substance, the electron conducting substance (in this case, carbon black) of the catalyst layer serves as a substrate to which a thin film electrolyte is bonded and the electrolyte and the catalyst layer are formed in one step.

50 wt % platinum having a mean particle diameter of 3 nm carried by Ketjen Black EC (trade name; manufactured by AKZO Chemie, the Netherlands) having a mean primary particle diameter of 30 nm was used as a cathode catalyst, while 25 wt % platinum having a mean particle diameter of 3 nm and 25 wt % ruthenium having a mean particle diameter of 3 nm that were carried by the same Ketjen Black EC were used as an anode catalyst.

This carbon carrying the catalysts, a PTFE dispersion and ion exchanged water were mixed, filtered, and then formed into a sheet by roller pressing. Silica sol having a mean particle diameter of 80 nm was applied thereto and dried, followed by burning in an argon gas at 500° C.

After burning, a trialkoxysilane compound $H^+SO_3$—$(CH_2)_2(CF_2)_{14}(CH_2)_2Si(OCH_3)_3$ was pressed into the surface to which the silica sol had been applied. Dealcoholization occurred between a hydroxyl group (—OH) on the silica sol surface and an alkoxy group (in this case, a methoxy group: —$OCH_3$), so that the trialkoxysilane compound was bonded onto the silica. These monomolecules were bonded to each other, thus forming an electrolyte part.

Figure 8:
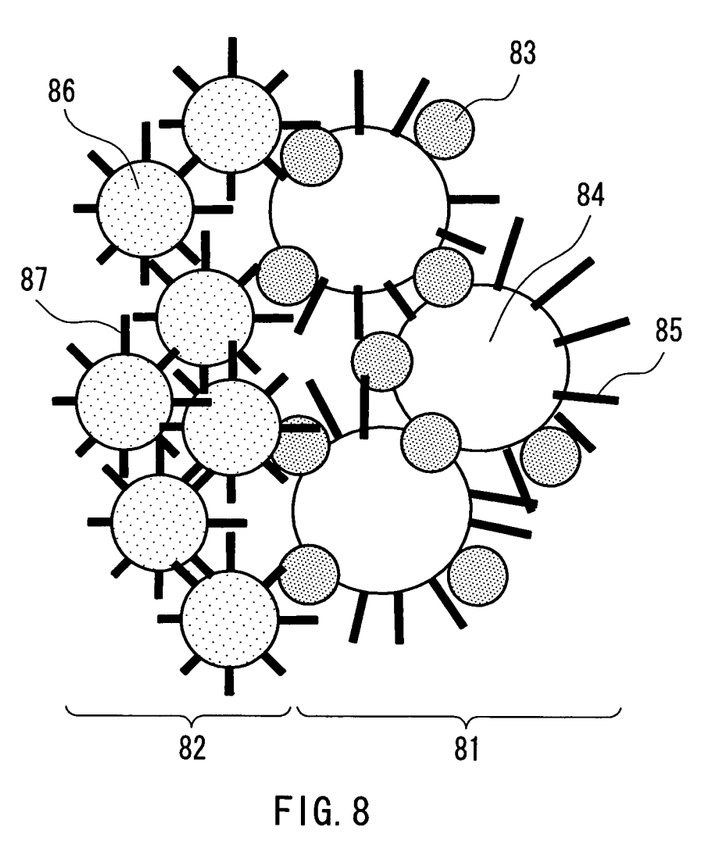
FIG. 8 is a schematic view showing an electrolyte membrane electrode assembly (MEA) according to Example 5 of the present invention.

The silane compound was filled in not only the silica sol portion but also a solidified catalyst portion, making it possible to produce the catalyst layer and the electrolyte part at one time. This was formed in one piece with carbon papers by the method described in Example 1 so as to form a MEA 5. FIG. 8 is a schematic view thereof. Numeral 81 denotes the catalyst layer portion, and numeral 82 denotes the electrolyte part. Numeral 83 denotes the catalyst, numeral 84 denotes the carbon carrying the catalyst, and numeral 85 denotes the thin film electrolyte formed on the carbon. Also, numeral 86 constituting the electrolyte part indicates the silica sol, and numeral 87 indicates the thin film electrolyte.

Then, a unit cell 5 was produced using this MEA 5 according to the method described in Example 1.

Example 6

Example 6 is directed to an exemplary case in which a catalyst layer includes catalyst particles, an electron conducting substance and other particles, and the added other particles (in this case, alumina particles) serve as a substrate to which a thin film electrolyte is bonded.

Alumina particles having a particle diameter of 100 μm were burned in a nitrogen atmosphere in an electric furnace at 150° C. for 3 hours and dried, and then immersed in a silane compound diluted solution described in Example 1 and stirred for 30 hours while being heated at 60° C. After the stirring, the washing and filtering were repeated using a toluene anhydride solution, followed by re-drying in a nitrogen atmosphere at a room temperature.

Figure 9:
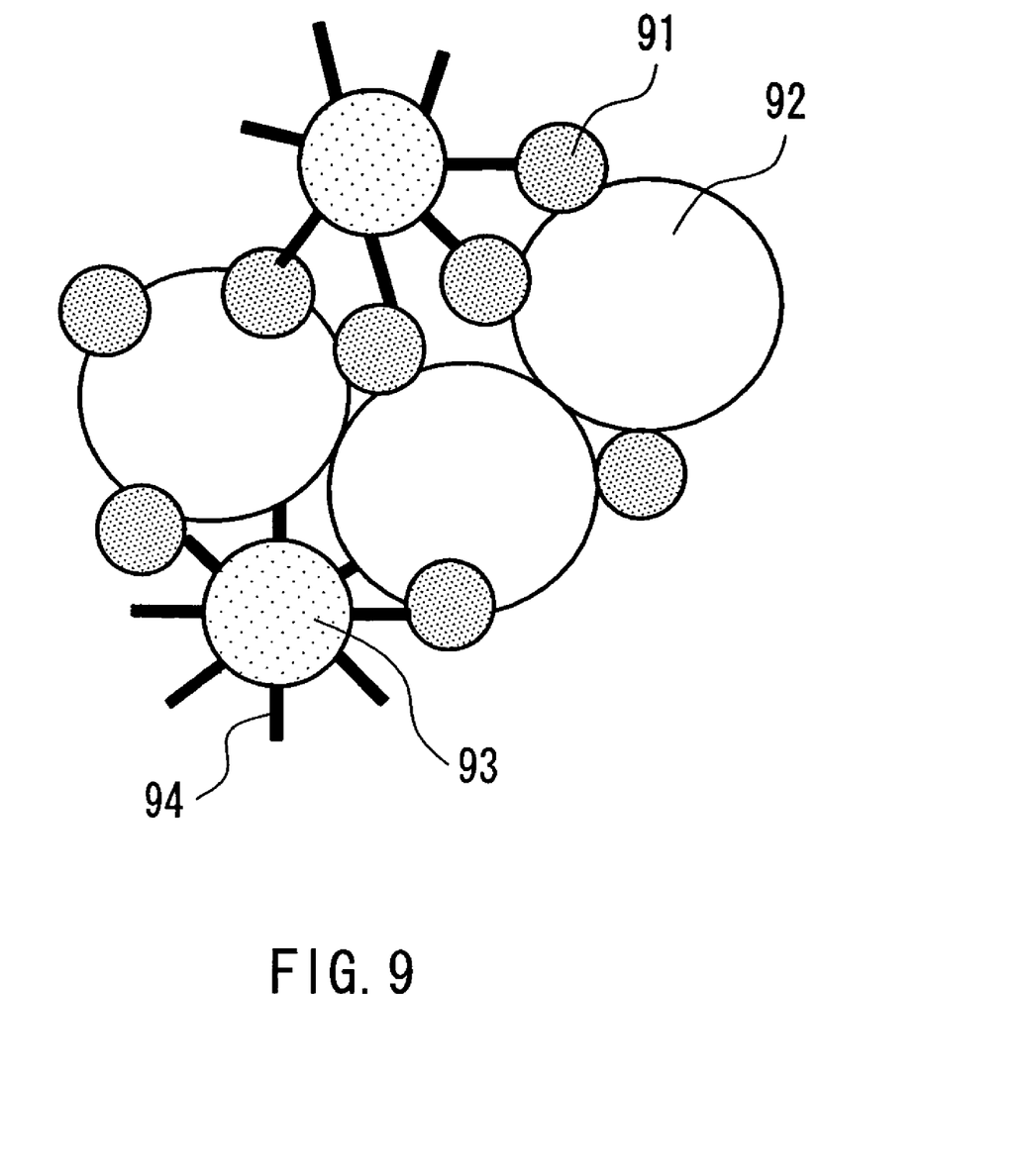
FIG. 9 is a schematic view showing an electrolyte membrane electrode assembly (MEA) according to Example 6 of the present invention.

The resultant alumina particles and platinum carrying carbon manufactured by Tanaka Kikinzoku Kogyo K.K. (TEC10E50E) or platinum ruthenium carrying carbon manufactured by Tanaka Kikinzoku Kogyo K.K. (TEC61E54) were mixed, to which ion exchanged water and a PTFE dispersion further were added, thus forming a catalyst paste. This catalyst paste was formed into a thin film and then formed as one piece with the electrolyte by the method described in Example 1, thus producing a MEA 6. FIG. 9 is a schematic view showing the MEA 6. Numeral 91 denotes the catalyst, numeral 92 denotes the carbon, numeral 93 denotes the alumina particles, and numeral 94 denotes the thin film electrolyte formed on the alumina particles.

In addition, a unit cell 6 was produced using the MEA 6.

Example 7

Example 7 is directed to an exemplary case in which a catalyst layer includes catalyst particles and other porous materials, the catalyst is present as one piece inside pores of the porous materials, and the porous materials serve as a substrate to which a thin film electrolyte is bonded.

A trialkoxysilane compound $H^+SO_3$—$(CH_2)_2(CF_2)_{14}(CH_2)_2Si(OCH_3)_3$ was pressed into pores of a 100 μm thick porous glass plate, which was an inorganic porous body, having 0.004 to 0.02 μm pores. Then, the porous glass plate was burned in the air at 120° C. so as to cause dealcoholization, thereby introducing an electrolyte into the pores.

Onto a surface of this porous glass plate, a catalyst paste containing platinum black and a Flemion solution FSS-1 (manufactured by ASAHI GLASS CO., LTD., 9 wt % ethanol solution), which was a perfluorocarbon sulfonic acid solution, was applied and then dried in a nitrogen atmosphere at 60° C. After drying, onto a surface opposite to the paste-applied surface, a catalyst paste containing platinum ruthenium black and the Flemion solution was applied and then dried in a nitrogen atmosphere at 60° C.

Figure 10:
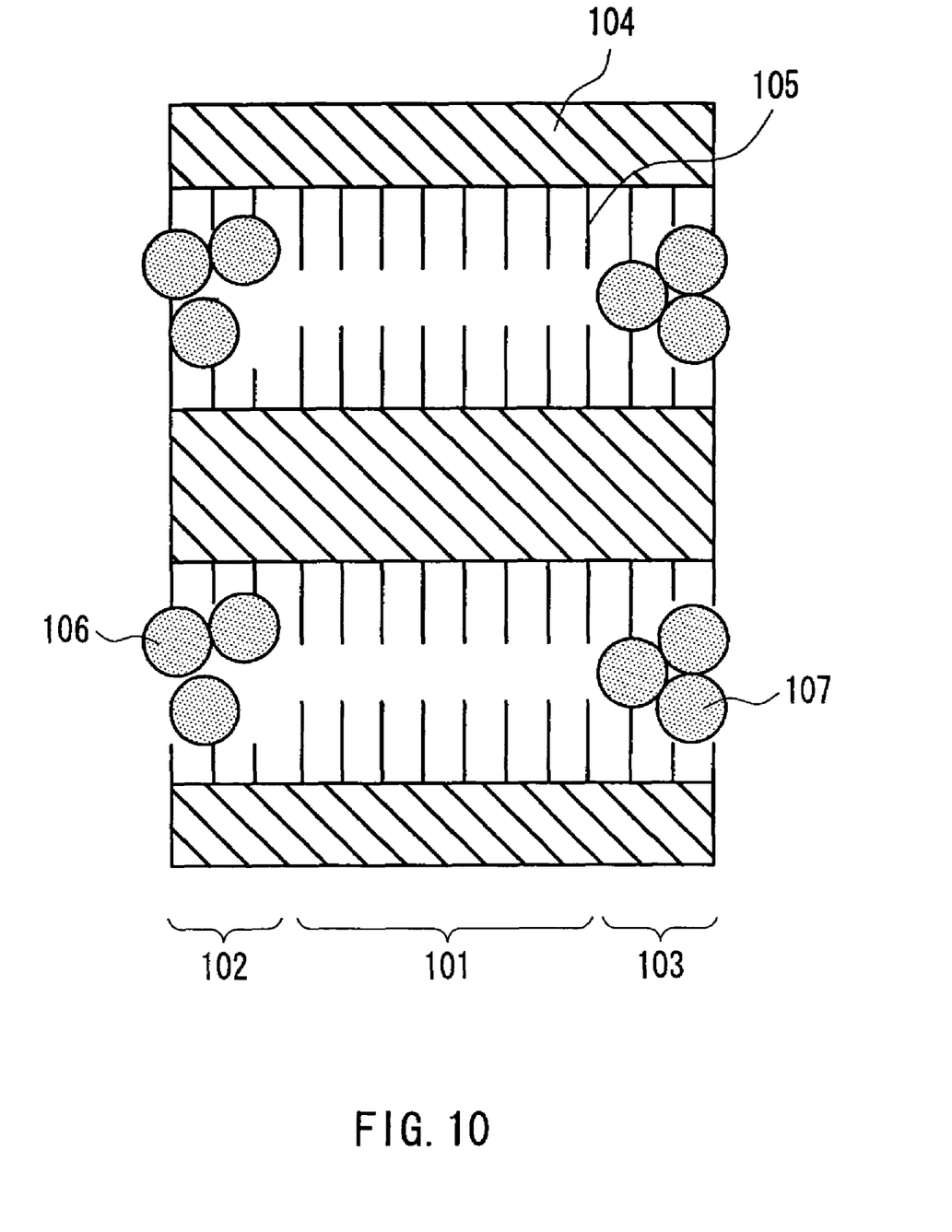
FIG. 10 is a schematic plan view showing an electrolyte membrane electrode assembly (MEA) according to Example 7 of the present invention.

FIG. 10 is a schematic view showing a catalyst layer. Numeral 101 denotes an electrolyte part, numeral 102 denotes an anode catalyst layer, and numeral 103 denotes a cathode catalyst layer. Numeral 104 denotes the porous glass plate, whose pores have an inner surface provided with a thin film electrolyte 105. Numeral 106 indicates the platinum ruthenium black forming the anode catalyst layer, and numeral 107 indicates the platinum black forming the cathode catalyst layer.

The outer sides of the catalyst layers were sandwiched by carbon papers from both sides in a manner similar to that in Example 1, thus forming a MEA 7. In addition, a unit cell 7 was produced using the MEA 7.

Example 8

Example 8 is directed to an exemplary case in which a catalyst layer includes catalyst particles, an electron conducting substance and other porous materials, the catalyst is present as one piece inside pores of the porous materials, and the porous materials serve as a substrate to which a thin film electrolyte is bonded.

A trialkoxysilane compound $H^+SO_3$—$(CH_2)_2(CF_2)_{14}(CH_2)_2Si(OCH_3)_3$ was pressed into pores of a 100 μm thick porous glass plate, which was an inorganic porous body, having 0.004 to 0.02 μm pores. Then, the porous glass plate was burned in the air at 120° C. so as to cause dealcoholization, thereby introducing an electrolyte into the pores of the porous glass plate.

Next, the pores of the porous glass plate were filled with a catalyst paste containing platinum carrying carbon TEC10E50E (manufactured by Tanaka Kikinzoku Kogyo K.K.) or platinum ruthenium carrying carbon TEC61E54 (manufactured by Tanaka Kikinzoku Kogyo K.K.), a PTFE dispersion and ion exchanged water.

The porous glass plate had the pores in which an electrolyte was formed, and the catalyst paste was filled in the pores and dried. Further, it was formed in one piece with a gas diffusion layer by the method described in Example 1 so as to obtain a MEA 8. A unit cell 8 was produced using the MEA8.

Figure 11:
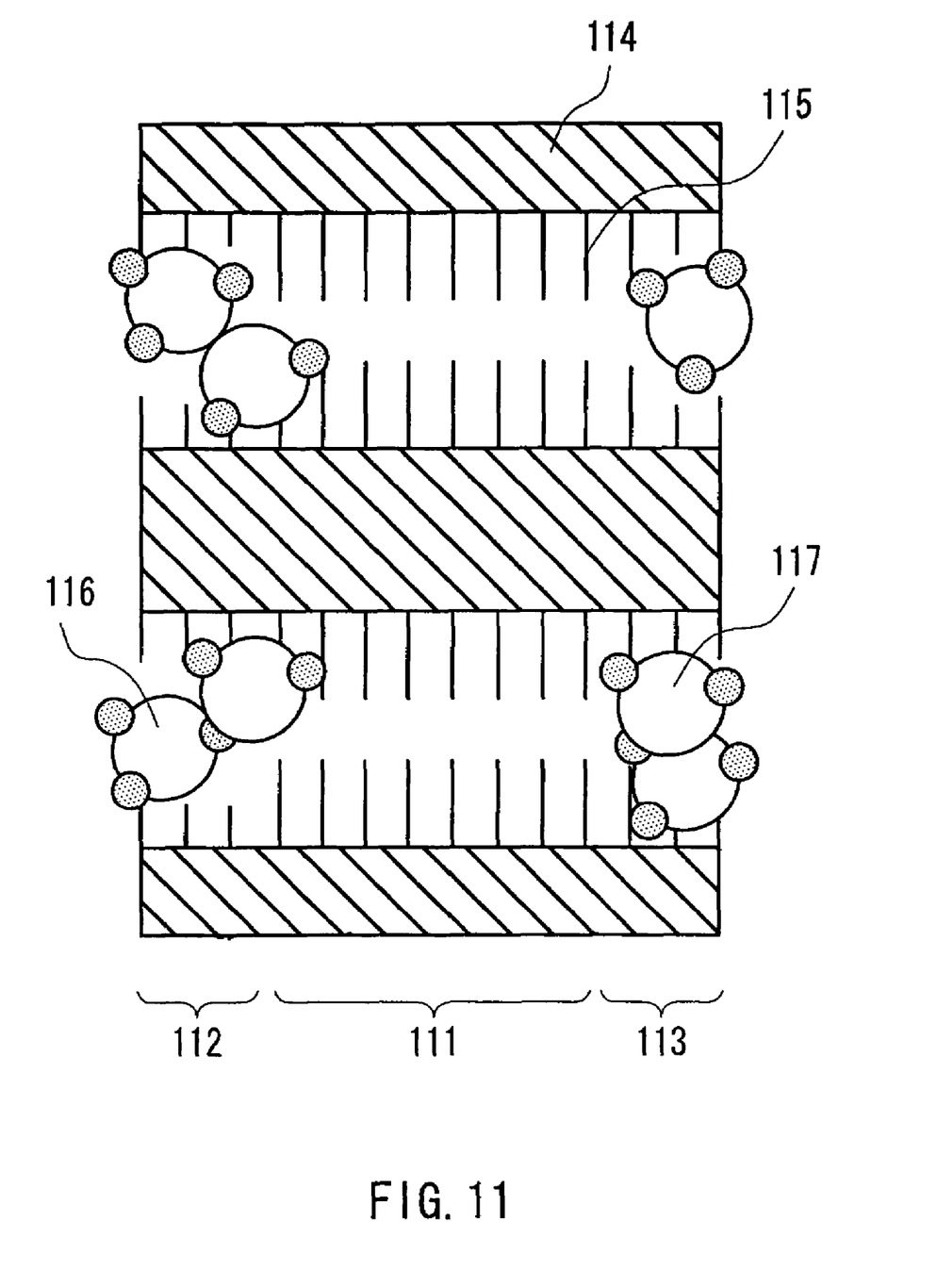
FIG. 11 is a schematic plan view showing an electrolyte membrane electrode assembly (MEA) according to Example 8 of the present invention.

FIG. 11 is a schematic view showing the MEA. Numeral 111 denotes an electrolyte part, numeral 112 denotes an anode catalyst layer, and numeral 113 denotes a cathode catalyst layer. Numeral 114 denotes the porous glass plate, whose pores have an inner surface provided with a thin film electrolyte 115. Numeral 116 indicates the platinum ruthenium carrying carbon forming the anode catalyst layer, and numeral 117 indicates the platinum carrying carbon forming the cathode catalyst layer.

Example 9

Example 9 is directed to a case of using functional groups other than a sulfonic acid as the ion-conducting functional group. Platinum carrying carbon or platinum ruthenium carrying carbon in which a functional group of the carrier carbon surface was treated according to the method described in Example 5 was immersed in a toluene solution containing a silane compound for 1 hour according to the method described in Example 1. Table 1 shows the silane compounds used here.

TABLE 1

| Functional group | HPO$_4$ | NH$_2$ | OH |
|---|---|---|---|
| Silane Compound | Formula (6) | Formula (7) | Formula (8) |
| Molecular weight | 151 | 80 | 131 |
| MEA | MEA 9 | MEA 10 | MEA 11 |

A catalyst layer of the MEA 9 was obtained using vinyltrimethoxysilane (Sila-Ace S210; manufactured by CHISSO CORPORATION, represented by the formula (6) below), which was the silane compound, as follows. A molecular thin film from the silane compound was formed on the catalyst carrying carbon according to the method described in Example 1 and then heated in a phosphoric acid solution. A catalyst layer of the MEA 10 was obtained using 3-aminopropyltrimethoxysilane (Sila-Ace S360; manufactured by CHISSO CORPORATION, represented by the formula (7) below), which was the silane compound. A catalyst layer of the MEA 11 was obtained using triglycidoxypropyltrimethoxysilane (KBM-403; manufactured by Shin-Etsu Chemical Co., Ltd., represented by the formula (8) below), which was the silane compound, as follows. After a molecular thin film was formed according to the method described in Example 1, the catalyst carrying carbon was washed in dilute sulfuric acid so as to cleave an epoxy ring, whereby an OH group was introduced.

(6) $CH_2=CH-Si(OCH_3)_3$ (8)

After the introduction of the functional group, the catalyst carrying carbon was washed using a toluene anhydride solution, dried in a nitrogen atmosphere and then mixed with ion exchanged water and a PTFE dispersion, thus preparing a catalyst paste, which was then applied to water-repellent carbon papers and cut into a predetermined size so as to be formed in one piece with an electrolyte part. MEAs produced as above were the MEA 9, the MEA 10 and the MEA 11, respectively. Further, a unit cell 9, a unit cell 10 and a unit cell 11 were produced using the respective MEAs.

Comparative Example

Comparative Example shows an exemplary case of using a perfluorocarbon sulfonic acid as an electrolyte in a catalyst layer. The catalyst layer used here was platinum or platinum ruthenium carried by Ketjen Black EC. 50 wt % platinum having a mean particle diameter of 3 nm carried by Ketjen Black EC (trade name; manufactured by AKZO Chemie, the Netherlands) having a mean primary particle diameter of 30 nm was used for a cathode, while 25 wt % platinum having a mean particle diameter of 3 nm and 25 wt % ruthenium having a mean particle diameter of 3 nm that were carried by the same Ketjen Black EC were used for an anode.

These catalyst carrying particles and a polymer electrolyte were mixed to form a catalyst paste. In this case, the weight ratio of carbon in the catalyst carrying particles to the polymer electrolyte was 1:1. The polymer electrolyte used here was an ethanol/isopropanol mixed solution of Nafion (manufactured by DuPont.), which was a perfluorocarbon sulfonic acid polymer.

Next, the catalyst paste was printed on an electrolyte part that had been produced by filling a thin film electrolyte in pores of an alumina membrane filter described in Example 1. The catalyst paste was formed in one piece with carbon papers according to the method described in Example 1, thus producing a MEA 12. In addition, a unit cell 12 was produced using the MEA 12.

Evaluation of Cell Performance

The produced unit cells 1 to 12 were individually stacked by the method described in Example 1 and evaluated. 2 mol/L methanol aqueous solution at 60° C. was supplied as a fuel at 2 cc per minute, and the air was supplied under the condition of a cell temperature of 60° C. and an air utilization factor of 30%. The air outlet was pressurized at 2 atm.

Table 2 shows OCV and mean unit cell voltages at current densities of 200 mA/cm$^2$ and 500 mA/cm$^2$.

TABLE 2

| Cell No. | OCV | 200 mA/cm$^2$ | 500 mA/cm$^2$ |
|---|---|---|---|
| Unit cell 1 | 782 | 501 | 367 |
| Unit cell 2 | 788 | 499 | 363 |
| Unit cell 3 | 788 | 498 | 360 |
| Unit cell 4 | 802 | 522 | 388 |
| Unit cell 5 | 798 | 512 | 378 |
| Unit cell 6 | 784 | 505 | 370 |
| Unit cell 7 | 798 | 494 | 360 |
| Unit cell 8 | 800 | 496 | 365 |
| Unit cell 9 | 788 | 498 | 373 |
| Unit cell 10 | 782 | 484 | 370 |
| Unit cell 11 | 780 | 480 | 363 |
| Unit cell 12 (Comp. Ex.) | 752 | 426 | 154 |

(unit: mV)

Even in the case of using 10 mol/L methanol aqueous solution, which was a high concentration methanol aqueous solution, the OCV and the voltages at a current density of 200 mA/cm$^2$ as shown in Table 3 were obtained.

TABLE 3

| Cell No. | OCV | 200 mA/cm$^2$ |
|---|---|---|
| Unit cell 1 | 392 | 209 |
| Unit cell 2 | 390 | 205 |
| Unit cell 3 | 388 | 202 |
| Unit cell 4 | 401 | 216 |
| Unit cell 5 | 398 | 212 |
| Unit cell 6 | 396 | 204 |
| Unit cell 7 | 402 | 204 |
| Unit cell 8 | 400 | 202 |
| Unit cell 9 | 396 | 210 |
| Unit cell 10 | 392 | 198 |
| Unit cell 11 | 388 | 196 |
| Unit cell 12 (Comp. Ex.) | 287 | 89 |

(unit: mV)

Even when using the high concentration methanol aqueous solution, the electrolyte in the catalyst layer did not elute very much. Accordingly, an effective reaction area, which was a contact of the catalyst, the fuel and the hydrogen ion conductor, increased, and thus, the voltage rose.

Incidentally, although methanol was used as an example of the fuel in the present example, the similar result was obtained also by using a hydrocarbon fuel such as hydrogen, ethanol, ethylene glycol, dimethyl ether, isopropanol, glycerin, methane or dimethoxymethane, or a mixture thereof. Further, the liquid fuels also may be mixed together in advance and supplied in the form of vapor.

Moreover, the structure of the gas diffusion layer of the present invention is not limited to the electrically conductive carbon paper illustrated in the above examples. Instead, other electrically conductive carbon cloths and metal meshes also can be used effectively.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A fuel cell for generating an electric power by supplying one electrode with a fuel and the other electrode with an oxidant, the fuel cell comprising:
    a catalyst layer formed on at least one surface of at least one of the one electrode and the other electrode,
    wherein the catalyst layer is a layer comprising a mixture of catalyst carrying carbon and other particles,
    the catalyst layer is obtained by chemically bonding a molecule comprising an ion-conducting functional group serving as an electrolyte to a surface of the other particles and then mixing the other particles and the catalyst carrying carbon,
    the chemical bond is a covalent bond formed by an elimination reaction, and
    the other particles are inorganic particles that comprise at least one selected from the group consisting of silica, alumina, quartz, glass, ceramics and mica.

2. The fuel cell according to claim 1, wherein the molecule comprising the ion-conducting functional group has a mean molecular weight of 40 to 10,000.

3. The fuel cell according to claim 1, wherein the molecule comprising the ion-conducting functional group comprises at least one selected from the group consisting of fluorocarbon and hydrocarbon.

4. The fuel cell according to claim 1, wherein the ion-conducting functional group is a proton dissociating functional group.

5. The fuel cell according to claim 4, wherein the proton dissociating functional group is at least one functional group selected from the group consisting of a phosphonyl group, a phosphinyl group, a sulfonyl group, a sulfinic group, a sulfonic group and a carboxyl group.

6. The fuel cell according to claim 1, wherein the ion-conducting functional group is a hydrogen bondable functional group.

7. The fuel cell according to claim 6, wherein the hydrogen bondable functional group is at least one functional group selected from the group consisting of a mercapto group, an ether linkage group, a nitro group, a hydroxyl group, a quaternary ammonium base and an amino group.

8. The fuel cell according to claim 1, wherein the chemical bond is a bond via an oxygen atom.

9. The fuel cell according to claim 1, wherein the catalyst carrying carbon comprise at least one selected from the group consisting of platinum, gold, palladium, nickel, rhodium, cobalt, iridium, osmium and iron.

10. The fuel cell according to claim 1, wherein the inorganic particles have a mean particle diameter ranging from 0.1 to 100 μm.

11. The fuel cell according to claim 1, wherein the catalyst layer has a thickness ranging from 0.1 to 10000 μm.

12. The fuel cell according to claim 1, wherein the elimination reaction is one of dealcoholization or dehydrochlorination.

13. The fuel cell according to claim 1, wherein the catalyst layer is obtained by chemically bonding a molecule comprising a silane compound including an ion-conducting functional group serving as an electrolyte to a surface of the other particles and then mixing the other particles and the catalyst carrying carbon.

* * * * *